US 12,445,199 B2

(12) United States Patent
Levy et al.

(10) Patent No.: US 12,445,199 B2
(45) Date of Patent: Oct. 14, 2025

(54) METHOD FOR COORDINATING ACCESS POINTS OF AN OPTICAL WIRELESS NETWORK USING A SELECTED HEURISTIC, AND ASSOCIATED COORDINATION DEVICE

(71) Applicant: OLEDCOMM, Velizy-Villacoublay (FR)

(72) Inventors: Victor Levy, Velizy-Villacoublay (FR); Carlos Usiel Dominguez-Gonzalez, Velizy-Villacoublay (FR)

(73) Assignee: OLEDCOMM ( * ) Notice: Subject to any disclaimer, the term of this patent is extended or adjusted under 35 U.S.C. 154(b) by 278 days.

(21) Appl. No.: 18/262,827

(22) PCT Filed: Jan. 18, 2022

(86) PCT No.: PCT/IB2022/050389
§ 371 (c)(1),
(2) Date: Jul. 25, 2023

(87) PCT Pub. No.: WO2022/157622
PCT Pub. Date: Jul. 28, 2022

(65) Prior Publication Data
US 2024/0097789 A1 Mar. 21, 2024

(30) Foreign Application Priority Data

Jan. 25, 2021 (FR) ...................................... 2100655

(51) Int. Cl.
H04B 10/114 (2013.01)
H04B 10/116 (2013.01)
(52) U.S. Cl.
CPC ....... H04B 10/1149 (2013.01); H04B 10/116 (2013.01)

(58) Field of Classification Search
CPC .......................... H04B 10/116; H04B 10/1149
(Continued)

(56) References Cited

U.S. PATENT DOCUMENTS

2009/0022112 A1* 1/2009 Shin .................... H04B 10/1149
370/336
2019/0028193 A1* 1/2019 Miras ................. H04B 10/1149
(Continued)

FOREIGN PATENT DOCUMENTS

| WO | WO 2019/179761 A1 | 9/2019 |
| WO | WO 2020/104274 A1 | 5/2020 |
| WO | WO 2020/104288 A1 | 5/2020 |

OTHER PUBLICATIONS

International Search Report as issued in International Patent Application No. PCT/IB2022/050389, dated Apr. 20, 2022.
(Continued)

Primary Examiner — Dalzid E Singh
(74) Attorney, Agent, or Firm — Pillsbury Winthrop Shaw Pittman LLP

(57) ABSTRACT

A method coordinates access points having coverage areas each subdivided into an exclusive sub-area supplemented by an interference sub-area where they overlap and forming part of an optical wireless network. The method includes a procedure including, for each time channel, a first sub-procedure wherein each interface device located in an exclusive sub-area of an access point is allocated an authorized free time slot in the time channel, a second sub-procedure wherein, as long as there remains an interface device without an allocated time slot in an interference sub-area, for each free time slot: a set of interface devices compatible with it is determined, if this set is not empty, an interface device is allocated this free time slot which is compatible with an available access point according to a chosen heuristic, (Continued)

otherwise the time slot is not free, the second sub-step is performed again.

13 Claims, 2 Drawing Sheets

(58) Field of Classification Search
USPC .......................................................... 398/172
See application file for complete search history.

(56) References Cited

U.S. PATENT DOCUMENTS

| | | | |
|---|---|---|---|
| 2022/0014271 A1* | 1/2022 | Van Wageningen | ......................... H04B 10/1149 |
| 2023/0179300 A1* | 6/2023 | Germe | ............... H04B 10/1149 398/130 |
| 2023/0308176 A1* | 9/2023 | Van Wageningen | ......................... H04B 10/1149 |

OTHER PUBLICATIONS

Van Wageningen et al., "G.vlc: Interference handling for neighbouring LiFi Access Points; C9", ITU-T Draft; Study Period 2017-2020; Study Group 15; Series C9, International Telecommunication Union, vol. 18/15, Apr. 14, 2020, XP044286020, Retrieved from the Internet: URL:https://www.itu.int/ifa/t/20I7/sg15/docs/rgm/Q18-200420/C/T17-SG15RGM-QI8-200420-C-0009.docx, pp. 1-11.

* cited by examiner

[Fig. 1]
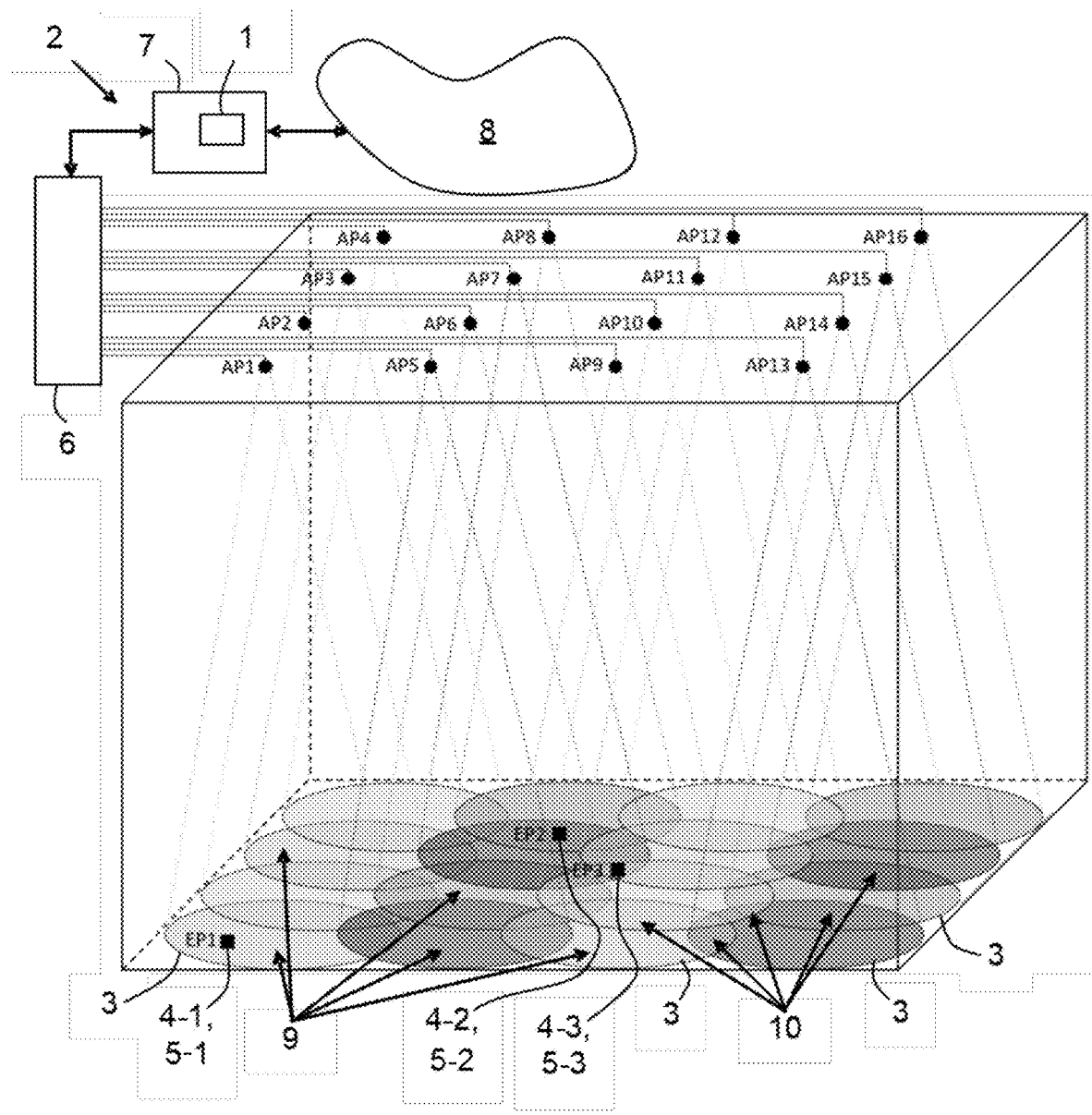

[Fig. 2]
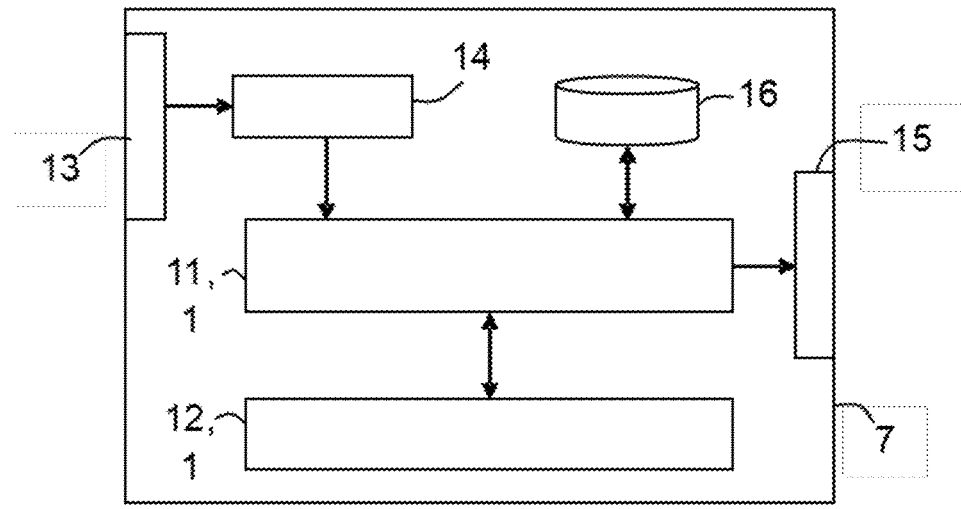
[Fig. 3]
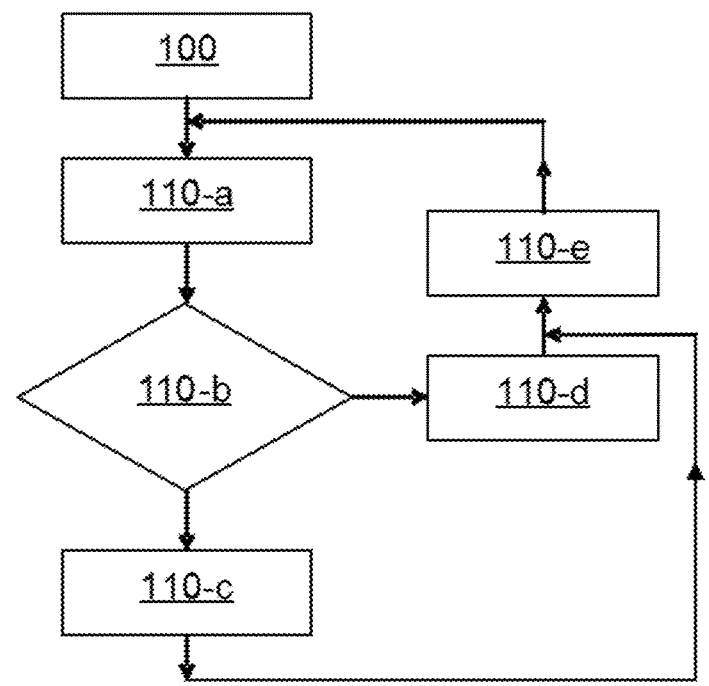

METHOD FOR COORDINATING ACCESS POINTS OF AN OPTICAL WIRELESS NETWORK USING A SELECTED HEURISTIC, AND ASSOCIATED COORDINATION DEVICE

CROSS-REFERENCE TO RELATED APPLICATIONS

This application is the U.S. National Stage of PCT/IB2022/050389, filed Jan. 18, 2022, which in turn claims priority to French patent application number 2100655 filed Jan. 25, 2021. The content of these applications are incorporated herein by reference in their entireties.

The present invention relates to a method for coordinating access points of an optical wireless network, and to associated computer program, coordination device and communication equipment.

The invention applies more particularly to the coordination of at least two access points belonging to an optical wireless network, possibly of the LiFi ("Light Fidelity") type, and having respective coverage areas each subdivided into a so-called "exclusive" sub-area supplemented by at least one so-called "interference" sub-area where they overlap. It will be understood that in an optical wireless network an access point is the only one able to communicate (transmitting/receiving), by means of intensity and/or frequency modulated light signals, with an interface device coupled to a communication device (such as for example a mobile telephone (possibly smart or "smartphone") or an electronic tablet or a computer (possibly portable)) and present in its exclusive sub-area. On the other hand, when several access points share the same interference sub-area, they can all communicate (transmitting/receiving), by means of intensity and/or frequency modulated light signals, with an interface device that is present in this common interference sub-area, which can create interference that heavily penalizes the network.

In addition to this problem of interference, there is also the problem of the mobility of communication devices to which the interface devices are coupled (generally accessories or "dongles"). Indeed, when a communication device is moved, it frequently moves from the coverage area of a first access point to the exclusive sub-area of a second access point adjacent to the first. When this communication device is participating in a communication, a handover must be carried out between the first and second access points to ensure that the communication is not interrupted.

Managing interference and handovers requires precise coordination of the access points in an optical wireless network. This coordination results from the rapid and up-to-date allocations to the access points of time slots in a time channel during which they can transmit at least to the interface devices located in their coverage areas. Thus, during a time channel, a list of access points authorized to transmit is defined, enabling these access points to then take their "turn to speak" in an orderly fashion during the successive time slots of this time channel. Of course, several access points can communicate respectively with several interface devices during the same time slot when they are not in an interference situation.

The mechanism that defines the order of turns to speak, and therefore the coordination of access points, in an optical wireless network is not currently defined by the recommendations of the International Telecommunication Union (ITU), particularly in the case of LiFi.

In patent documents WO 2020/104274 and WO 2020/104288, an example of programming transmissions in wireless networks (and in particular LiFi) has been proposed. More specifically, these documents propose, in the presence of several access points and interference, an automatic allocation of reserved time slots to the access points so that they announce their presence without interference and enable user equipment to detect the presence of a neighboring access point in a single MAC (Medium Access Control) cycle. Rapid detection allows time slots in the network to be quickly rescheduled to avoid interference when a piece of communication device enters an interference sub-area common to two access points. However, such a solution is not satisfactory in practice, particularly as it does not deal with handovers.

It may therefore be desirable to provide full and effective coordination of access points.

To this end, a method is proposed, on the one hand, intended to enable the coordination of at least two access points having respective coverage areas each subdivided into an exclusive sub-area supplemented by at least one interference sub-area where they overlap and forming part of an optical non-wired network, and, on the other hand, comprising a step wherein the access points are allocated time slots of a time channel during which they can transmit at least to interface devices each located in at least one of their coverage areas and respectively coupled to communication devices.

This coordination method is characterized by the fact that its step comprises, for each time channel created:
  a first sub-step wherein each interface device located in an exclusive sub-area of an access point is allocated a free time slot of the latter in the considered time channel, then
  a second sub-step wherein, as long as there remains at least one interface device located in an interference sub-area and without an allocated time slot, for each free time slot of said time channel,
    a first set of interface devices compatible with the considered free time slot is determined, then
    if the first set is non-empty, the considered free time slot is allocated to an interface device which it comprises and compatible with an available access point according to a chosen heuristic, or if said first set is empty, the considered free time slot is considered not to be free, then
    the second sub-step is performed again if there is still a free time slot of said time channel.

In this way, precise and complete coordination of access points is obtained, making it easier to manage interference and handovers.

The coordination method according to the invention may comprise other features which may be taken separately or in combination, and in particular:
  in the second sub-step, before performing it again, the first set and a second set of access points and interface devices which can still transmit/receive in the considered time slot may be updated;
  in a first embodiment, in the second sub-step a so-called "least opportunity cost" chosen heuristic may be used wherein a pair of access point and interface device having the least opportunity cost among respective opportunity costs of all the pairs that can be constituted is allocated;
  in a second embodiment, in the second sub-step, a so-called "maximum opportunity cost" chosen heuristic may be used, wherein a pair of access point and interface device having the maximum opportunity cost among respective opportunity costs of all the pairs that can be constituted is allocated;

in a third embodiment, in the second sub-step a so-called "two-level popularity" chosen heuristic may be used wherein an access point is first chosen and then an interface device compatible with said chosen access point is chosen. For example, in the second sub-step, an access point may be first chosen which creates a minimum number of constraints through interference, and then an interface device is chosen which is the most difficult to serve;

in a fourth embodiment, in the second sub-step another so-called "two-level popularity" chosen heuristic may be used wherein an interface device is first chosen, and then an access point compatible with said chosen interface device is chosen. For example, in the second sub-step, an interface device is first chosen which is the most difficult to serve, and then an access point is chosen which creates a minimum number of constraints through interference;

the optical wireless network can be of the LiFi (Light Fidelity) type.

The invention further proposes a computer program downloadable from a communication network and/or recorded on a computer-readable medium and/or executable by a processor, and comprising instructions for executing the step of a coordination method of the type presented above, when executed on a processor device or a computer.

The invention further proposes a coordination device, on one hand, making it possible to coordinate at least two access points having respective coverage areas each subdivided into an exclusive sub-area supplemented by at least one interference sub-area where they overlap and forming part of an optical wireless network, and, on the other hand, comprising at least one processing unit and at least one memory suitable for allocating to the access points time slots of a time channel during which they can transmit at least to interface devices each located in at least one of their coverage areas and respectively coupled to communication devices.

This coordination device is characterized in that, for each time channel created, its processing unit and memory are dedicated to:
  a) allocating to each interface device located in an exclusive sub-area of an access point a free time slot of the latter in said time channel, and then
  b) as long as there remains at least one interface device located in an interference sub-area and without an allocated time slot, for each free time slot of said time channel,
    determining a first set of interface devices compatible with the considered free time slot, then
    if said first set is non-empty, allocating to an interface device that it comprises the considered free time slot which is compatible with an available access point according to a chosen heuristic, or if said first set is empty, considering the considered free time slot as not free, then
    performing said b) again if there is still a free time slot in said time channel.

The invention further proposes communication equipment intended to form part of an optical wireless network comprising, on the one hand, at least two access points having respective coverage areas each subdivided into an exclusive sub-area supplemented by at least one interference sub-area where they overlap and, on the other hand, at least one coordination device of the type presented above.

For example, this communication equipment may constitute a network controller.

The invention will be better understood with the aid of the following description, given solely by way of example and with reference to the appended drawings wherein:

FIG. 1 is a diagrammatic and functional representation of an example of an optical wireless network comprising a coordination device according to the invention and having a global coverage area in which three items of communication equipment equipped with an interface device are located, FIG. 2 illustrates diagrammatically and functionally an example of a network controller intended to equip an optical wireless network and comprising a coordination device according to the invention, and FIG. 3 diagrammatically illustrates an example of an algorithm implementing a coordination method according to the invention.

In particular, a purpose of the invention is to propose a coordination method, and an associated coordination device 1, intended to enable the coordination of at least two access points APj of an optical wireless network 2 so as to facilitate the management of interference and handovers between access points APj.

FIG. 1 shows diagrammatically and functionally an example of a wireless optical network 2 (hereinafter simply referred to as a network). This network 2 comprises here, but is not limited to, sixteen access points APj (j=1 to 16) each having a coverage area 3 and each arranged to communicate with interface devices 4-$k$ which are respectively coupled to portable or mobile communication devices 5-$k$. In FIG. 1, each reference EPk (here k=1 to 3) designates a device comprising a portable or mobile communication device 5-$k$ to which an interface device 4-$k$ is coupled.

Each access point APj operates in transmitting and receiving modes. When transmitting, an access point APj is responsible for transforming electrical signals carrying information (or data), which it has received from a router (or switch) 6 of the network 2, into intensity-modulated and/or frequency-modulated light signals for transporting this same information (or data) and which it transmits in its coverage area 3 to at least one interface device 4-$k$. When receiving, an access point APj is responsible for transforming light signals, modulated in intensity and/or frequency (to carry information (or data)) and which it has received from an interface device 4-$k$, into electrical signals carrying this same information (or data) and which it transmits to the router 6.

As non-limitingly illustrated in FIG. 1, all the access points APj may, for example, be attached (directly or indirectly) to the ceiling (or sub-ceiling) 11 of at least one room 12.

Also, as non-limitingly illustrated in FIG. 1, all the access points APj may be coupled to the same router 6 with which they exchange electrical signals (carrying information (or data)). However, this is not compulsory, as a network 2 may comprise several routers 6. This router 6 may, for example, be of the PoE (Power over Internet) type. In addition, this router 6 is coupled to a network controller 7 which is itself coupled to an access network 8, which may be non-wired (e.g., of the WAN (Wireless Access Network) type). The router 6 can therefore exchange electrical signals (carrying information (or data)) with at least one access network 8. This access network 8 may be part of the network 2. However, this is not compulsory, as it could be part of an external network to which the network 2 is coupled.

Like an access point APj, each interface device 4-$k$ operates in transmitting and receiving modes. When transmitting, an interface device 4-$k$ is responsible for transforming electrical signals carrying information (or data), which it has received from the communication device 5-$k$ to which it is coupled, into intensity-modulated and/or frequency-modulated light signals to carry this same information (or data) and which it transmits to the access point APj to which it is temporarily coupled. When receiving, an interface device 4-$k$ is responsible for transforming light signals, modulated in intensity and/or frequency (to carry information (or data)) and which it has received from an access point APj, into electrical signals carrying this same information (or data) and which it transmits to the communication device 5-$k$ to which it is coupled.

For example, interface device 4-$k$ can be an accessory (or dongle).

Also, for example, communication device 5-$k$ can be a mobile phone (possibly smart or smartphone) or an electronic tablet or a computer (possibly portable) or a communicating gaming console.

It should be noted that in the example illustrated non-limitingly in FIG. 1, the network 2 comprises sixteen access points APj which must be coordinated (for their ordered "turns to speak"). However, it can comprise any number of access points APj, as long as this number is at least equal to two and the coverage areas 3 of the access points APj partially overlap at least two by two. Because of this partial overlap between coverage areas 3, each coverage area 3 is subdivided into an "exclusive" sub-area 9 completed by at least one "interference" sub-area 10. In its exclusive sub-area 9, an access point APj is the only one able to communicate (transmitting/receiving) with interface device 4-$k$ coupled to communication device 5-$k$. An interference sub-area 10 is an area in which at least two neighboring coverage areas 3 partially overlap, and is therefore likely to be subject to interference. The overall coverage area of the network 2 is therefore equal to the sum of the exclusive sub-areas 9 and the interference sub-areas 10.

In the following, we consider that network 2 is of the LiFi type, and therefore the coordination of access points APj concerns the standard protocol layers G.9991 and G.9961 (called G.vlc), defined by the ITU. However, the invention is not limited to this type of network. It relates to any type of optical wireless network based on time and/or frequency multiplexing.

As indicated above, the invention proposes, in particular, a coordination method intended to enable the coordination of the access points APj of the network 2. This coordination method may be implemented at least partially by a coordination device 1 according to the invention, or by a dedicated computer program executed on a processor device or a computer. This dedicated computer program comprises instructions for executing the steps of the coordination method and may be downloadable from a communication network and/or recorded on a computer-readable medium and/or executable by a processor (or processing unit) of an item of equipment coordinating the access points APj.

As non-limitingly illustrated in FIG. 2, the coordination device 1 comprises at least one processing unit 11 and at least one memory 12 cooperating together. The processing unit 11 may, for example, be a processor, possibly a digital signal processor (or DSP). The memory 12 stores data files and computer program files whose instructions are intended to be executed by the processing unit 11 (or processor). This memory 12 may, for example, be of the RAM ("Random Access Memory") type, but it could be of another type. This processing unit 11 and this memory 12 are arranged to carry out operations together to ensure the coordination of the access points APj described below.

In the non-limitingly example illustrated in FIGS. 1 and 2, the coordination device 1 is part of a network controller 7 (or communication equipment) of the network 2. However, in an alternative embodiment (not illustrated) the coordination device 1 could be a dedicated added-on piece of device (or accessory) in the network 2, for example coupled to the network controller 7. The latter (7) may possibly be part of one of the access points APj, which then acts as global master, for example after an election or a static and/or dynamic predetermination.

As illustrated, the network controller 7 may further comprise an input interface 13 for receiving at least the electrical signals (comprising the information or data) in order to use them in calculations or processing, possibly after having shaped and/or demodulated and/or amplified them, in a manner known per se, by means of a digital signal processor 14. In addition, this network controller 7 may also comprise an output interface 15, in particular for delivering coordination messages or transmitting electrical signals, and/or a mass memory 16.

The network controller 7 may, for example, be made in the form of a combination of electrical or electronic circuits or components (or hardware), possibly micro-programmed or micro-wired, of software modules (or software), of integrated circuits of the FPGA ("Field Programmable Gate Array") type and of specialized integrated circuits (or ASIC ("Application-Specific Integrated Circuit")).

As non-limitingly illustrated by the example algorithm of FIG. 3, a coordination method according to the invention comprises a step 100 and 110-$a$ to 110-$e$ wherein the access points APj are allocated (by the coordination device 1) time slots ttn of a time channel ct during which they can transmit at least to interface devices 4-$k$ which are each located in at least one of their coverage areas 3 and respectively coupled to communication devices 5-$k$. As shown below, this allocation takes place in first 100 (or a)) and second 110-$a$ to 110-$e$ (or b)) sub-steps, for each time channel ct created.

In the first sub-step 100 (or (a)), each interface device 4-$k$ located in an exclusive sub-area 9 of an access point APj (of the network 2) is allocated (by the coordination device 1) a free time slot ttn of the latter (APj) in the time channel ct under consideration. This produces first pairs (interface device 4-$k$/access point APj) which are each allocated time slots ttn of the time channel ct in question. Once each of the interface device 4-$k$ located in exclusive sub-areas 9 has been allocated a time slot ttn of the time channel ct under consideration, it is then possible in the second sub-step 110-$a$ to 110-$e$ (or b)) to allocate (by the co-ordination device 1) time slots ttn which are still free to the interface devices 4-$k$ located in interference sub-areas 10.

More specifically, in this second sub-step 110-$a$ to 110-$e$ (or b)), as long as there remains at least one interface device 4-$k$ located in an interference sub-area 10 and without a time slot ttn allocated, for each free time slot ttn of the time channel under consideration, a first set e1 of interface devices 4-$k$ which are compatible with said free time slot ttn is determined (by the coordination device 1) in a first sub-sub-step 110-$a$.

Then, in a second sub-sub-step 110-$b$, the content of the first set e1 is analyzed (by the coordination device 1). If the first set e1 is not empty, in a third sub-sub-step 110-$c$, the free time slot ttn considered and compatible with an access point APj available according to a chosen heuristic is allocated (by the coordination device 1) to an interface device 4-$k$ included in the first set e1. On the other hand, if the first set e1 is empty, said free time slot ttn is considered (by the coordination device 1) not to be free (or not allocable), in a fourth sub-sub-step 110-$d$.

Then, in the two alternatives (110-$c$ and 110-$d$), the second sub-step 110-$a$ to 110-$e$ (or b)) is performed again (by the coordination device 1) if there is still a free time slot ttn of the time channel ct under consideration.

In this way, precise and complete coordination of the access points APj is obtained, which facilitates the management of interference and handovers.

Preferably, in the second sub-step 110-$a$ to 110-$e$, before performing the second sub-step again, in a fifth sub-sub-step 110-$e$ the first set e1 and a second set e2 of access points APj and interface devices 4-$k$ that can still transmit/receive in the considered time slot ttn are updated (by the coordination device 1). These updates of the first set e1 and the second set e2 make it possible to take account of new incompatibilities which may have been created by the allocations made.

At least four different heuristics can be chosen.

In a first embodiment, in the second sub-step 110-$a$ to 110-$e$, a so-called "least opportunity cost" chosen heuristic may be used (by the coordination device 1). In the latter, a free time slot is allocated (by the coordination device 1) each time to the pair of access point APj and interface device 4-$k$ which has the least opportunity cost among respective opportunity costs of all the pairs (APj/4-$k$) that can be constituted.

It will be understood that as soon as one pair (APj/4-$k$) is allocated, this can block the allocation of at least one other pair (APj/4-$k$) (and often several others). We therefore define an opportunity cost of allocating the pair (APj/4-$k$) as the number of pairs that can no longer be allocated simultaneously if this pair (APj/4-$k$) is chosen.

The aim of the least opportunity cost heuristic is therefore to allocate the pair (APj/4-$k$) which has the lowest opportunity cost, in order to minimize the constraints and therefore to maximize the number of pairs possible for allocation at the next instant.

It should be noted that it is preferable not to consider among the blocked pairs (APj/4-$k$) those which comprise interface devices 4-$k$ which have already been allocated or access points APj which are forbidden by interference.

The second embodiment uses a so-called "maximum opportunity cost" chosen heuristic which is the inverse of that of the first embodiment. In this second embodiment, in the second sub-step 110-$a$ to 110-$e$ one (the coordination device 1) can allocate each time a free time slot to the pair of access point APj and interface device 4-$k$ that has the maximum opportunity cost among respective opportunity costs of all the pairs (APj/4-$k$) that can be constituted.

The aim of the maximum opportunity cost heuristic is therefore to allocate the pair (APj/4-$k$) which creates the most constraint and therefore has the highest opportunity cost, in order to "get rid of" it as quickly as possible.

In a third embodiment, in the second sub-step 110-$a$ to 110-$e$ a chosen heuristic known as "two-level popularity" may be used. In the latter one (the co-ordination device 1) first chooses, each time, an access point APj, then one (the co-ordination device 1) chooses an interface device 4-$k$ which is compatible with this chosen access point APj.

For example, in the third embodiment, in the second sub-step 110-$a$ to 110-$e$ the access point APj which creates a minimal number of constraints through interference may be chosen first (by the coordination device 1), and then the interface device 4-$k$ which is the most difficult to serve may be chosen (by the coordination device 1).

With this last heuristic, the selection is therefore made according to popularity, i.e., the number of interface devices 4-$k$ (respectively access points APj) with which each access point APj (respectively interface device 4-$k$) can establish a communication. At each second sub-step 110-$a$ to 110-$e$, the device (APj or 4-$k$) which is the least popular is therefore chosen, which corresponds roughly for the access points APj to those which create the least constraints through interference, and for the interface devices 4-$k$ to those which are the most difficult to serve (less coverage).

It should be noted that with this last heuristic it is preferable that interface devices 4-$k$ which have already been allocated and access points APj which are forbidden by interference do not contribute to the popularity score.

The fourth embodiment uses another so-called "two popularity levels" chosen heuristic which is the reverse of that of the third embodiment. In this fourth embodiment, in the second sub-step 110-$a$ to 110-$e$ an interface device 4-$k$ is first chosen (by the coordination device 1), then an access point APj is chosen (by the coordination device 1) which is compatible with the chosen interface device 4-$k$.

For example, in the fourth embodiment, in the second sub-step 110-$a$ to 110-$e$ the interface device 4-$k$ that is the most difficult to serve may be chosen first (by the coordination device 1), and then the access point APj that creates a minimum number of interference constraints may be chosen (by the coordination device 1).

It should be noted that one or more sub-steps 100 and 110-$a$ to 110-$e$ of the coordination method can be carried out by different components. Thus, the coordination method may be implemented by a plurality of digital signal processors, random access memory, mass memory, input interface, output interface.

It should also be noted that the network controller 7 can optionally store and update a general table (or the like) accessible to any network element and defining "which network element is connected to which other network element" at each instant. In this case, each access point APj and each device EPk also store this general table in order to be able to anticipate possible interference and possible movements of the devices EPk and to direct the flows correctly, without the need for reports. The invention therefore enables faster transfers (or handovers) between access points APj thanks to the prediction of directions of movement of devices EPk.

It should also be noted that random speech time allocation (or CSMA for Carrier Sense Multiple Access) may be envisaged.

It should also be noted that the invention is not limited to the embodiments described above. Indeed, it will be apparent to those skilled in the art that various modifications can be made to the embodiments described above, in the light of the teaching just disclosed to them. In the detailed presentation of the invention made above, the terms used should not be interpreted as limiting the invention to the embodiments set out in the present description, but should be interpreted to include all equivalents the anticipation of which is within the reach of those skilled in the art by applying their general knowledge to the implementation of the teaching just disclosed to them.

The invention claimed is:

1. A method for coordinating at least two access points having respective coverage areas each subdivided into an exclusive sub-area supplemented by at least one interference sub-area where they overlap and forming part of an optical wireless network, said method comprising a step wherein the access points are allocated time slots of a time channel during which the access points are adapted to transmit at least to interface devices each located in at least one of their coverage areas and respectively coupled to communication devices, wherein said step comprises, for each time channel created:
a first sub-step wherein each interface device located in an exclusive sub-area of an access point is allocated a free time slot of the latter in said time channel, then
a second sub-step wherein, as long as there remains at least one interface device located in an interference sub-area and without an allocated time slot, for each free time slot of said time channel,
a first set of interface devices compatible with the considered free time slot is determined, then
if said first set is non-empty, the considered free time slot is allocated to an interface device which it comprises and compatible with an available access point according to a chosen heuristic, or if said first set is empty, the considered free time slot is considered not to be free, then
said second sub-step is performed again if there is still a free time slot of said time channel.

2. The method as claimed in claim 1, wherein in said second sub-step, before performing it again, said first set and a second set of access points and interface devices still able to transmit/receive in the considered time slot are updated.

3. The method as claimed in claim 1, wherein in said second sub-step a least opportunity cost chosen heuristic is used wherein a pair of access point and interface device having the least opportunity cost among respective opportunity costs of all the pairs that can be constituted is allocated.

4. The method as claimed in claim 1, wherein in said second sub-step a maximum opportunity cost chosen heuristic is used wherein a pair of access point and interface device having the maximum opportunity cost among respective opportunity costs of all the pairs that can be constituted is allocated.

5. The method as claimed in claim 1, wherein in said second sub-step a two-level popularity chosen heuristic is used wherein an access point is first chosen, then an interface device compatible with said chosen access point is chosen.

6. The method as claimed in claim 5, wherein in said second sub-step an access point is first chosen which creates a minimum number of constraints through interference, and then an interface device is chosen which is the most difficult to serve.

7. The method as claimed in claim 1, wherein in said second sub-step a two-level popularity chosen heuristic is used wherein an interface device is first chosen, then an access point compatible with said chosen interface device is chosen.

8. The method as claimed in claim 7, wherein in said second sub-step an interface device is first chosen which is the most difficult to serve, and then an access point is chosen which creates a minimum number of constraints through interference.

9. The method according to claim 1, wherein said optical wireless network is of a LiFi network.

10. A non-transitory computer-readable medium comprising instructions for executing the step of a coordination method as claimed in claim 1, when said instructions are executed on a processor device or a computer.

11. A coordination device for coordinating at least two access points having respective coverage areas each subdivided into an exclusive sub-area supplemented by at least one interference sub-area where they overlap and forming part of an optical wireless network, said device comprising at least one processing unit and at least one memory adapted to allocate to said access points time slots of a time channel during which they are adapted to transmit at least to interface devices each located in at least one of their coverage areas and respectively coupled to communication devices, wherein for each time channel created, said processing unit and said memory are dedicated to:
a) allocating to each interface device located in an exclusive sub-area of an access point a free time slot of the latter in said time channel, and then
b) as long as there remains at least one interface device located in an interference sub-area and without an allocated time slot, for each free time slot of said time channel,
determining a first set of interface devices compatible with the considered free time slot, then
if said first set is non-empty, allocating to an interface device that it comprises the considered free time slot which is compatible with an available access point according to a chosen heuristic, or if said first set is empty, considering the considered free time slot as not free, then
performing again said b) if there is still a free time slot of said time channel.

12. A communication equipment for an optical wireless network comprising at least two access points having respective coverage areas each subdivided into an exclusive sub-area supplemented by at least one interference sub-area where they overlap, wherein the communication equipment further comprises at least one coordination device according to claim 11.

13. The communication equipment as claimed in claim 12, wherein the communication equipment constitutes a network controller.

* * * * *